(12) United States Patent
Lu

(10) Patent No.: US 8,146,213 B2
(45) Date of Patent: Apr. 3, 2012

(54) HAND PULLER WITH DETACHABLE HANDLE

(76) Inventor: Jung-Wen Lu, Dali (TW)

( * ) Notice: Subject to any disclaimer, the term of this patent is extended or adjusted under 35 U.S.C. 154(b) by 327 days.

(21) Appl. No.: 12/546,635

(22) Filed: Aug. 24, 2009

(65) Prior Publication Data

US 2011/0041300 A1 Feb. 24, 2011

(51) Int. Cl.
*B25B 25/00* (2006.01)
(52) U.S. Cl. ..................................... 24/68 CD
(58) Field of Classification Search ............... 24/68 CD, 24/68 R, 909; 254/218, 223, 217, 237, 238, 254/222, 243, 250–252, 256, 257
See application file for complete search history.

(56) References Cited

U.S. PATENT DOCUMENTS

| 6,908,073 B1 * | 6/2005 | Hsien | 254/218 |
| 7,350,768 B1 * | 4/2008 | Chang | 254/218 |
| 7,758,023 B2 * | 7/2010 | Chang | 254/218 |

FOREIGN PATENT DOCUMENTS

| TW | M319128 | 9/2007 |
| TW | M320549 | 10/2007 |

* cited by examiner

*Primary Examiner* — James Brittain
(74) *Attorney, Agent, or Firm* — Wang Law Firm, Inc.; Li K. Wang

(57) ABSTRACT

A hand puller with a detachable handle includes a body, an axle, and a handle. The axle is passed and mounted onto the body, and a sheath opening is formed at an end of the handle for sheathing an edge of the axle, such that the handle can be turned by using the axle as an axial center, and a guide section is defined and formed at an external periphery of the sheath opening, and the body includes at least one stop portion protruded from a position proximate to the guide section of the handle. When the handle is turned by using the axle as the axial center, the guide section and the stop portion are slidably coupled to restrict a radial movement of the handle to prevent the handle from being separated from the axle along the radial direction.

6 Claims, 6 Drawing Sheets

HAND PULLER WITH DETACHABLE HANDLE

BACKGROUND OF THE INVENTION

1. Field of the Invention

The present invention relates to a hand puller structure, in particular to a hand puller with a detachable handle.

2. Description of the Related Art

R.O.C. Pat. No. M319128 entitled "Detachable rope puller" and R.O.C. Pat. No. M320543 entitled "Detachable rope puller (1)" disclose a rope puller structure with a detachable handle for preventing others to turn the handle to loosen a rope and also preventing others to untie and steal fastened goods easily.

However, the aforementioned detachable rope puller still has the following shortcomings:

1. In the aforementioned rope pullers, the handle includes a notch at a front end of the handle, such that the handle can be sheathed onto an axle of the rope puller through the notch. In addition, a limit element is installed at the handle for sealing the notch of the handle to prevent the handle from being separated from the axle when the handle is installed onto the axle. However, the additionally installed limit element not only causes a higher level of difficulty for assembling the rope puller, but also incurs a higher manufacturing cost of the rope puller.

2. In the aforementioned rope pullers, the limit element and the axle will abut against each other when a user turns the handle, and thus not only affecting the smooth rotation of the handle, but also causing deformations when the limit element is compressed excessively. As a result, the notch of the handle cannot be sealed by the limit element, and the handle may fall out easily.

3. If the aforementioned rope pullers are under no tension (or at a rope release status), the handle is used for propping a brake plate to release the axle, while the handle is being pressed by the brake plate at the same time to produce a deviation along the radial direction, and the smooth operation of the axle at the rope release status will be affected adversely by the deviated compression from the handle.

SUMMARY OF THE INVENTION

Therefore, it is a primary objective of the present invention to provide a hand puller with a detachable handle having the features of a simple structure, a low cost, and a quick detachable handle.

Another objective of the present invention is to provide a hand puller with a detachable handle, such that when the handle is turned, the handle is maintained at the axial center of the rotation to assure a smooth turning of the handle.

A further objective of the present invention is to provide a hand puller with a detachable handle to overcome the difficulty of releasing a rope through a conventional hand puller, whose axle is abutted by the handle if the handle is situated at a rope release status.

To achieve the foregoing objectives, the present invention provides a hand puller with a detachable handle, and the hand puller comprises a body, an axle, and a handle, wherein the axle is passed into the body, and a ratchet wheel is mounted onto both ends of the axle separately, and the body includes a first brake plate embedded and latched to the two ratchet wheels for restricting the ratchet wheel and the axle to rotate in a one-way direction only, and an end of the handle includes a sheath opening sheathed onto a corresponding edge of the axle, and the handle includes a second brake plate embedded and latched to the ratchet wheel for pushing the ratchet wheel in a one-way direction and synchronously driving the axle to coil a rope when the handle is turned in an opposite rotational direction of the first brake plate by using the axle as an axial center. The invention has the following characteristics:

The handle defines and forms a guide section at an external periphery of the sheath opening, and the body includes at least one stop portion protruded from a position adjacent to the handle guide section, such that the guide section of the handle and the stop portion are slidably coupled with each other when the handle is turned by using the axle as the axial center, so as to limit a radial movement of the handle and prevent the handle from being separated from the axle along the radial direction.

DETAILED DESCRIPTION OF THE PREFERRED EMBODIMENTS

Figure 1:
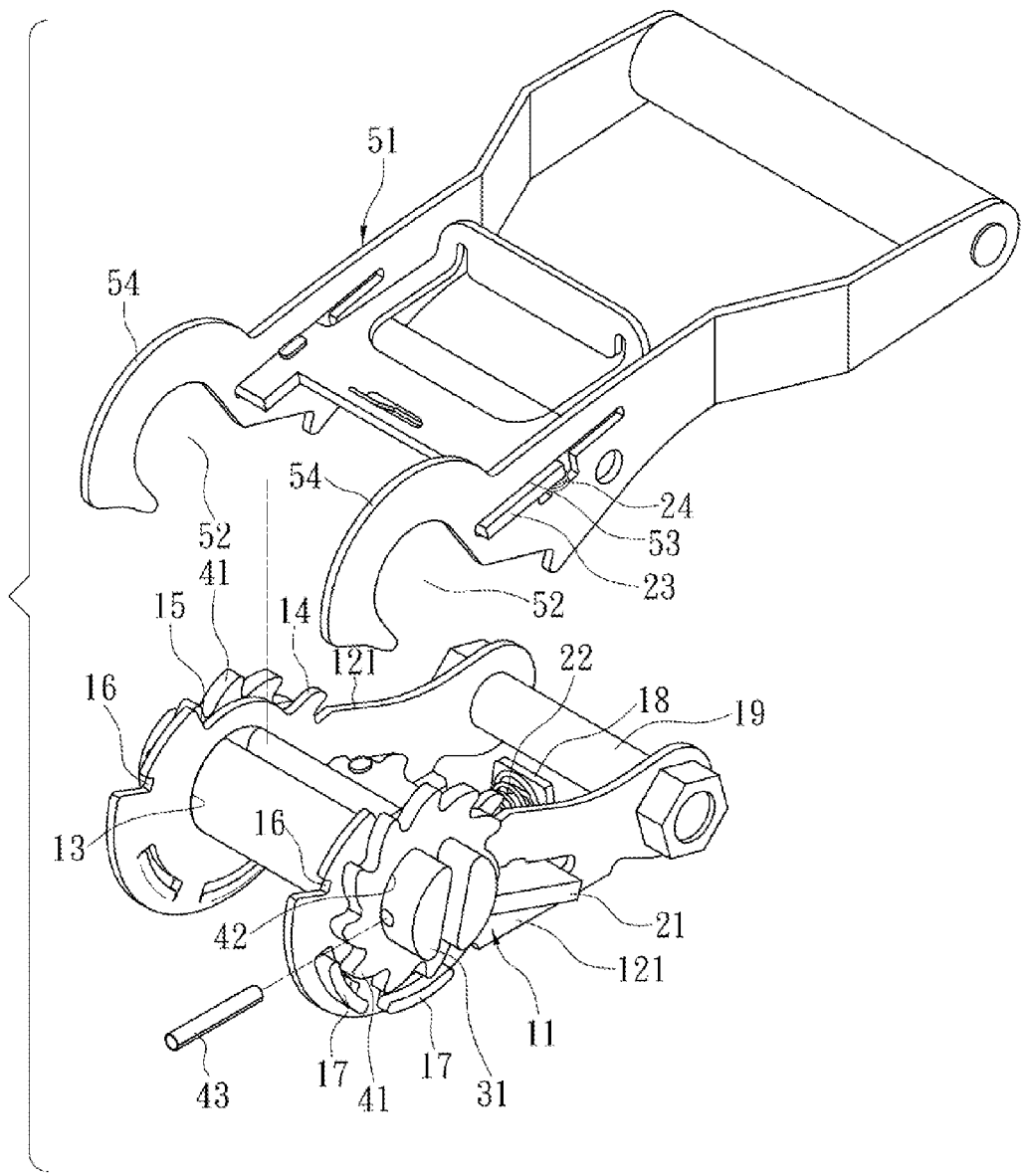
FIG. 1 is an exploded view of the present invention.
Figure 2:
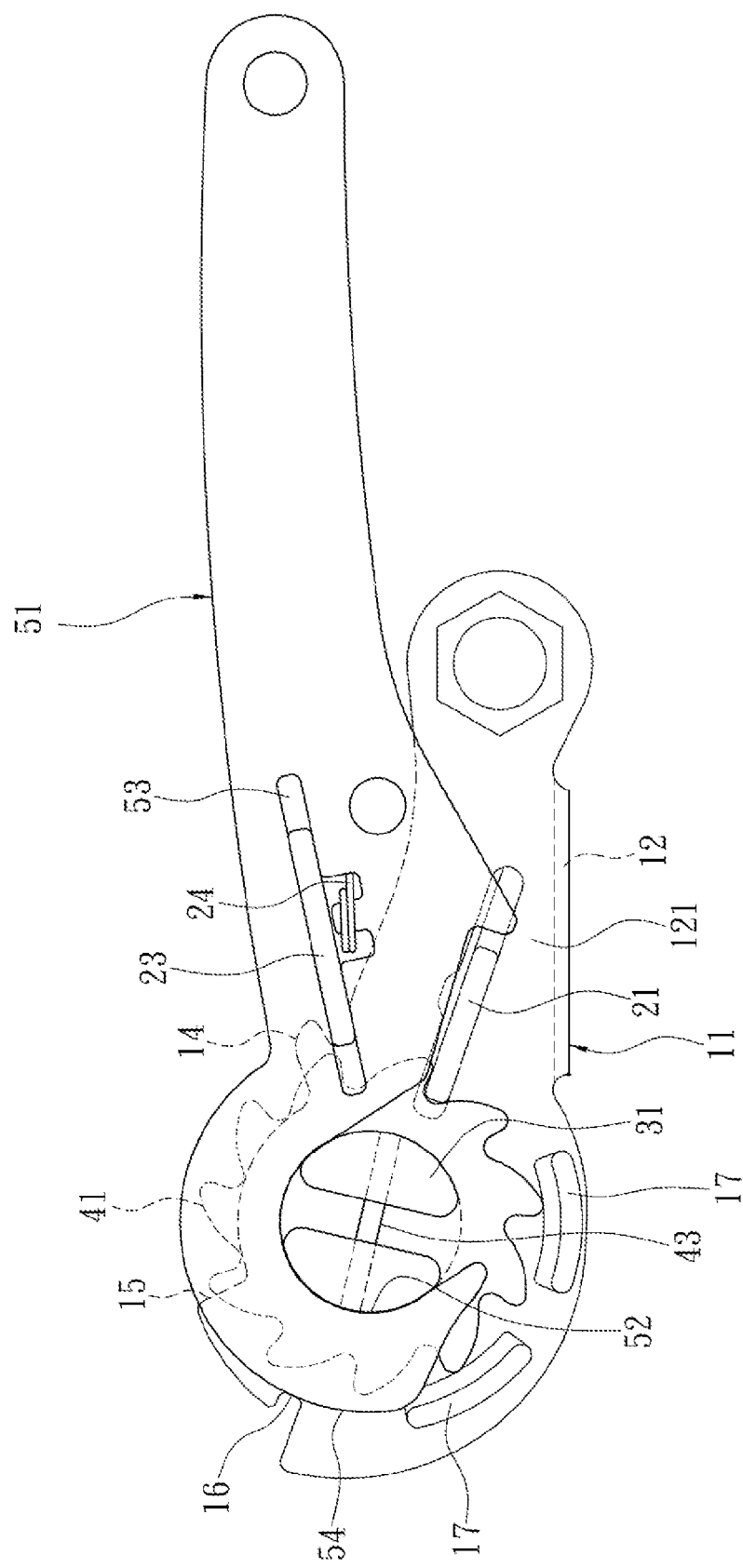
FIG. 2 is a schematic view of an assembled structure of the present invention.

With reference to FIGS. 1 and 2 for a hand puller with a detachable handle in accordance with a first preferred embodiment of the present invention, the hand puller comprises a body 11, an axle 31, two ratchet wheels 41 and a handle 51.

The body 11 includes two symmetric side plates 121 protruded from a bottom plate 12, a penetrating hole 13 formed at a front end of the two side plates 121 of the body 11, a bump 14, an upper latch portion 15 and an indentation 16 formed sequentially at the external periphery of the front end of each side plate 121, and two stop portions 17 are disposed with an interval apart from each other and on an external side of a front end of two side plates 121 of the body 11, outwardly turned and integrally formed by stamping front ends of the two side plates of the body respectively. The body 11 further comprises a brake base 18 disposed at a position proximate to a rear end of the side plate 121 for accommodating a first brake plate 21, and a compression spring 22 installed between the brake base 18 and the first brake plate 21, such that the first brake plate 21 has a propping force in a direction towards the penetrating hole 13 of the body 11, and a rope rod 19 is passed through a rear end of the body 11.

The axle 31 is comprised of two semicircular iron pieces and passed through the penetrating bole 13 of the body 11, and when the axle 31 is rotated in the penetrating hole 1, both ends of the axle 31 are protruded out of the penetrating hole 13.

The two ratchet wheels 41 have a brake hole 42 each, and the two ratchet wheels 41 are passed into both ends exposed from the axle 31 through the brake hole 42 and rotated synchronously with the axle 31. Since both ends of the axle 31 lave a stop pin 43 for preventing the two ratchet wheels 41 from falling outward from the axle 31, and the first brake plate 21 is abutted by the compression spring 22 to cut into the two ratchet wheels 41 for limiting the ratchet wheel 41 and the axle 31 to rotate in a one-way direction only.

The handle 51 includes a sheath opening 52 having an opening facing downward and formed at an end of the handle 51, and the sheath opening 52 of the handle 51 is provided for sheathing onto both ends of the axle 31 protruded from the penetrating hole 13, and the axle 31 is used as an axial center for the rotation. In addition, a slide slot 53 is formed symmetrically and separately on both sides of the handle 51 for accommodating a second brake plate 23, and the second brake plate 23 is abutted by a torque spring 24 to have a propping force in a direction towards the sheath opening 52 of the handle 51, such that the second brake plate 23 can be embedded and latched onto the two corresponding ratchet wheels 41 along the slide slot 53. When the handle 51 is turned in an opposite rotational direction of the first brake plate 21 by using the axle 31 as an axial center, the handle 51 can push the ratchet wheel 41 in a one-way direction and synchronously drive the axle 31 to coil a rope. The handle 51 defines and forms an arc shaped guide section 54 at an external periphery of the sheath opening 52. When the handle 51 is sheathed onto the axle 31, the guide section 54 of the handle 51 and the stop portion 17 of the body 11 are disposed adjacent to each other, such that if the handle 51 is turned to a position proximate to the bump 14 of the body 11, the guide section 54 of the handle 51 will be no longer stopped by the stop portion 17 of the body 11 anymore, and separated upward from the axle 31, and if the handle 51 uses the axle 31 as an axial center and the second brake plate 23 to push the ratchet wheel 41 in a one-way direction, the guide section 54 of the handle 51 and the stop portion 17 are slidably coupled with each other to limit a radial movement when the handle 51 is turned.

Figure 3:
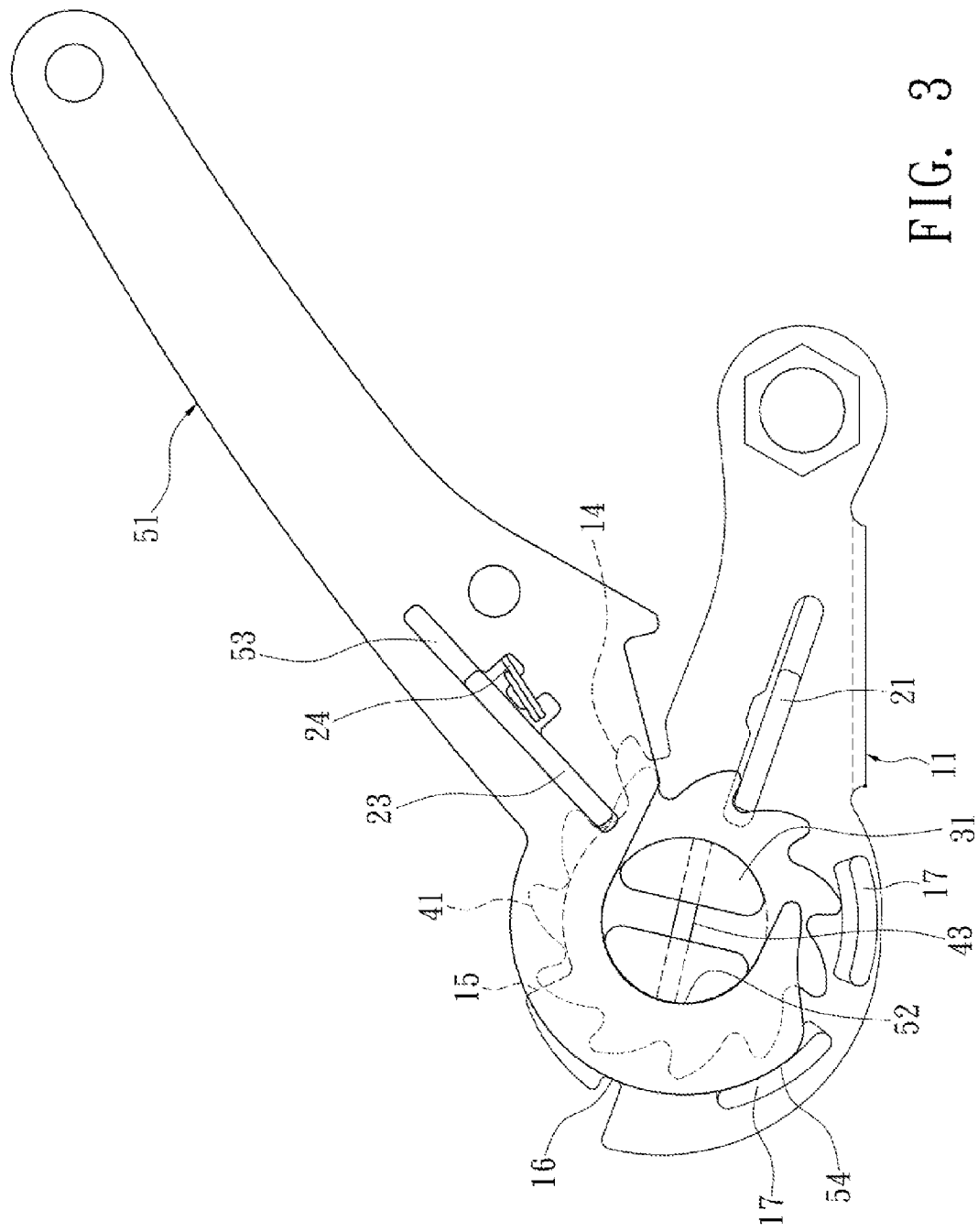
FIG. 3 is a schematic view of an application of the present invention, showing the status of a handle being turned from the top of a bump to drive a ratchet wheel to rotate in one-way rotational direction
Figure 4:
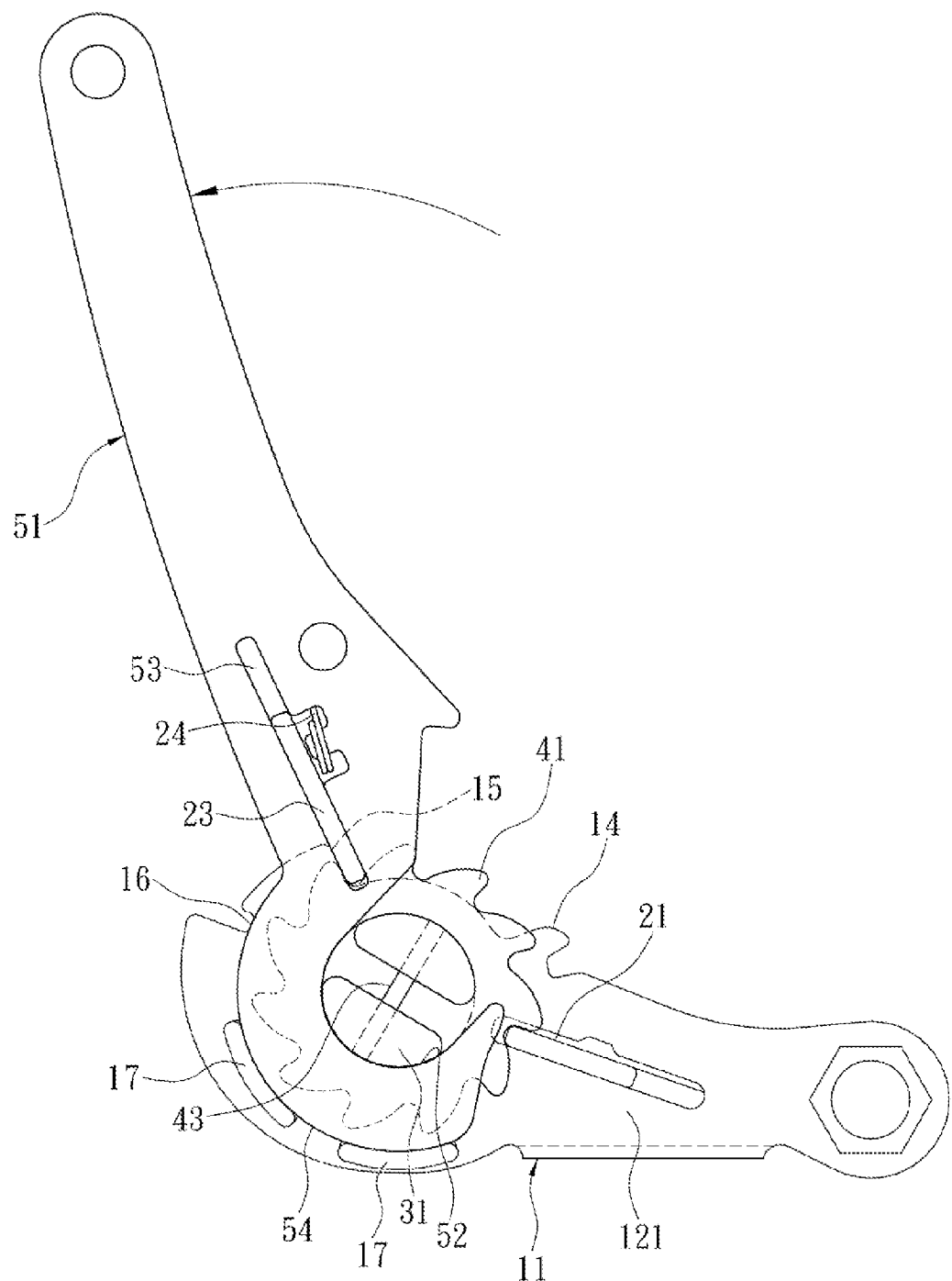
FIG. 4 is a schematic view of an application of the present invention, showing the status of a handle being situated at the position of an upper latch portion.

With reference to FIGS. 3 and 4 for a practical application of the present invention, if the handle 51 is sheathed onto the axle 31, a user needs to turn the handle 51 back and forth, and the second brake plate 23 of the handle 51 drives the two ratchet wheels 41 to rotate in a one-way direction, and the axle 31 is rotated at the same time to perform a movement of coiling a rope. When the handle 51 is turned back and forth, the guide section 54 of the handle 51 and the stop portion 17 of the body 11 are slidably coupled to make sure that the handle 51 will not be separated from the axle 31 along the radial direction when the handle 51 is turned.

In FIG. 2, if the user turns the handle 51 to a position of the bump 14 of the body 11, and the second brake plate 23 is embedded and latched to the bottom of the bump 14 of the body 11, the handle 51 can be embedded and latched to the bottom of the bump 14 and situated at a locked status through the second brake plate 23. When the user overcomes the resilience of the torque spring 24 and pulls the second brake plate 23 away from the blocking of the bump 14, the guide section 54 of the handle 51 will not be stopped by the stop portion 17 of the body 11, and thus the handle 51 can be separated upward easily from the axle 31 through the sheath opening 52, such that the user can remove the handle 51.

Figure 5:
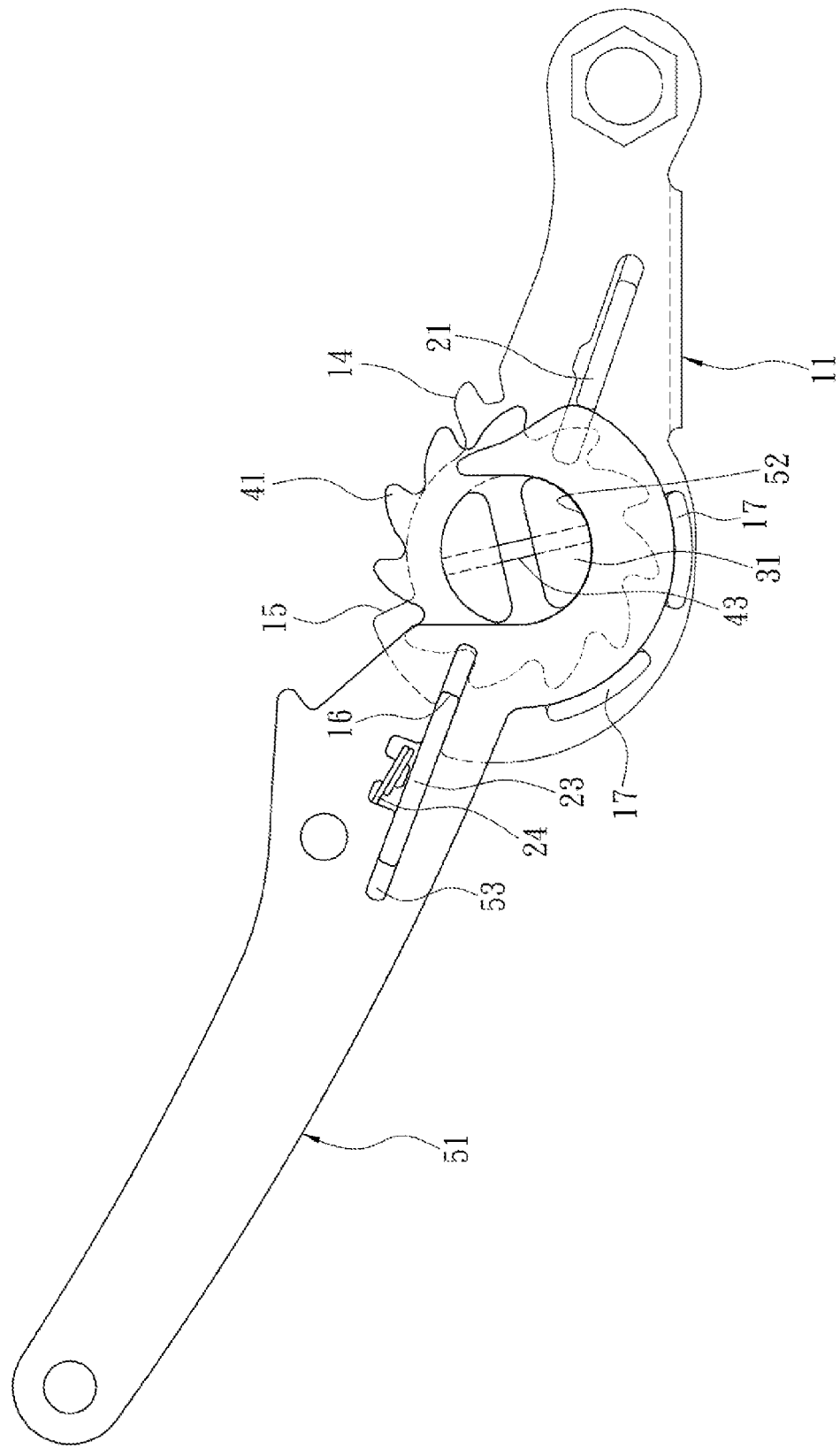
FIG. 5 is a schematic view of an application of the present invention, showing the status of the handle being turned to the position of an indentation of the body to release an axle.

With reference to FIG. 5, when the user turns the handle 51 to a position of the indentation 16 of the body 11 and the second brake plate 23 is separated from the ratchet wheel 41 and embedded and latched into the indentation 16 of the body 11, the first brake plate 21 of the body 11 will be abutted by a front end of the guide section 54 of the handle 51 and separated from the ratchet wheel 41, so as to release the axle 31 to a rope release status. Since a radial stopping action provided by the stop portion 17 of the body 11 is exerted onto the guide section 54 of the handle 51, therefore the axial center of the turning handle 51 and the axial center of the axle 31 are coaxial, and the handle 51 will not be propped and deviated by the first brake plate 21, and thus the invention can prevent the axle 31 from being deviated by the handle 51 that affects the smooth operation of the axle 31 in the rope release status.

Figure 6:
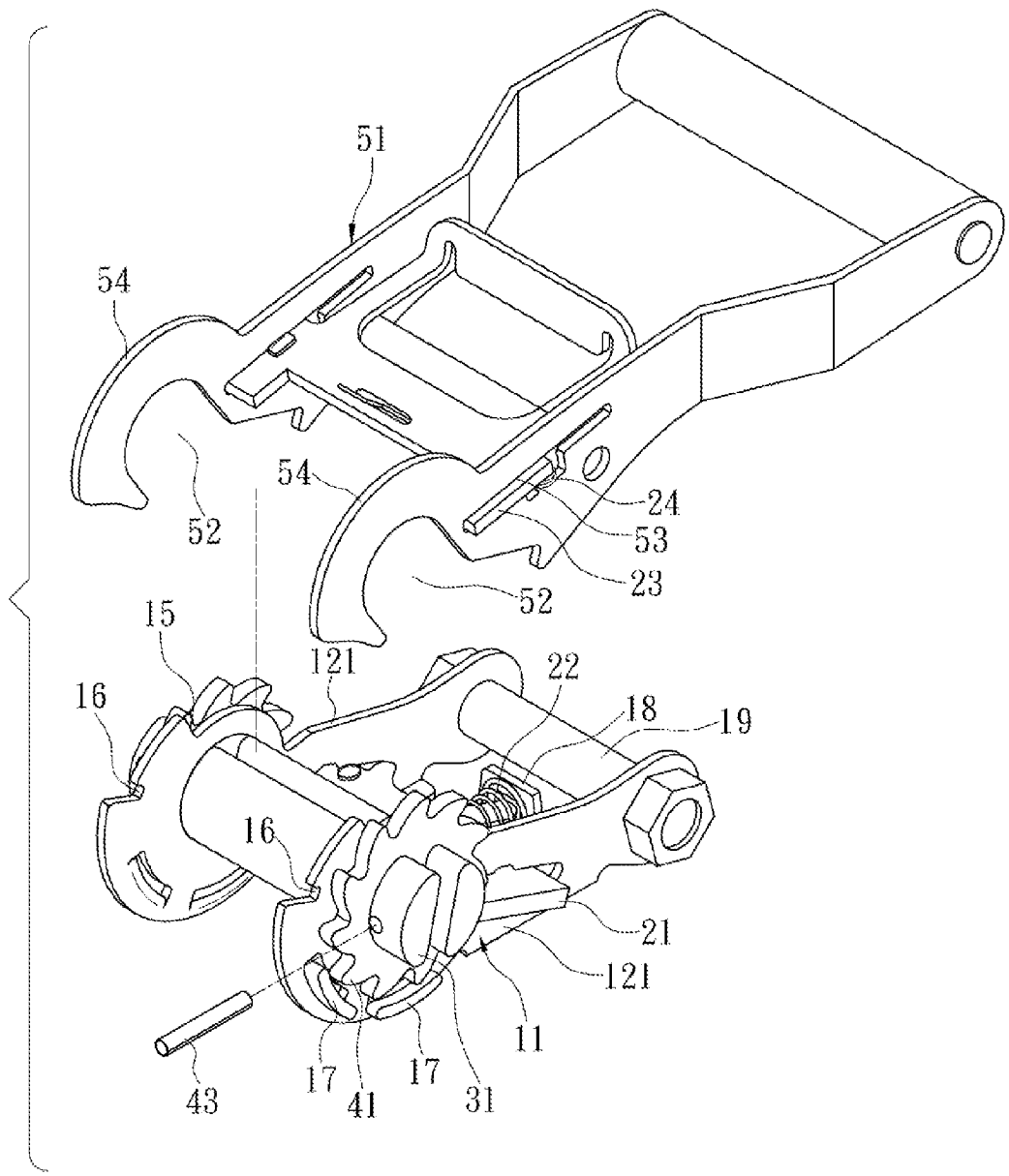
FIG. 6 is a schematic view of a structure of a second preferred embodiment of the present invention.

With reference to FIG. 6 for a second preferred embodiment of the present invention, the difference between the second preferred embodiment and the first preferred embodiment resides on that an upper latch portion 15 and an indentation 16 are formed sequentially at the external periphery of each side plate 121 of the body 11, such that when the handle 51 is turned by using the axle 31 as an axial center, the guide section 54 of the handle 51 and the stop portion 17 will be slidably coupled with each other for limiting a radial movement of the handle 51 to prevent the handle 51 from being separated from the axle 31 in the radial direction.

With the structure comprising the aforementioned elements, the present invention has the following advantages:

1. The present invention comes with a simple structure, and thus incurs a low manufacturing cost.

2. The present invention comes with a design of the stop portion of the body disposed adjacent to the guide section of the handle, such that when the handle is turned, the handle will not be separated easily from the axle in the radial direction, and when the handle is turned and the guide section of the handle is not stopped by the stop portion of the body, the handle can be separated from the axle easily. Thus the present invention can provide an easy way of installing and removing the handle to and from the body in a simple and quick manner.

3. The present invention comes with a design of the stop portion of the body, such that when the handle is turned, the handle can be maintained at the axial center to assure a smooth turning of the handle.

4. With the design of the stop portion of the body, the present invention can provide a stopping action in a radial direction when the handle puller is at a rope release status, so as to assure that the axial center of the turning handle and the axial center of the axle are coaxial, and the handle will not be deviated to affect the smooth operation of the axle easily, when the hand puller is at a rope release status.

What is claimed is:

1. A hand puller with a detachable handle comprising:
a body with a first side plate and a second side plate, each side plate having a penetrating hole;
an axle installed on the body and extending through a penetrating hole on each side plate, the axle having two ends;
a first ratchet wheel and a second ratchet wheel, the first ratchet wheel being mounted on the axle adjacent to the first side plate and the second ratchet wheel being mounted on the axel adjacent to the second side plate; and
a handle with a sheath opening for sheathing onto both end of the axle, the handle defining and forming a guide section at an external periphery of the sheathing opening,
wherein
the body includes a first brake plate embedded and latched to two ratchet wheels for limiting two ratchet wheels and the axle to rotate toward a first direction only, the body also includes a stop portion protruded from a position proximate to the guide section of the handle,
the handle includes a second brake plate embedded and latched to two ratchet wheels, such that the handle can push two ratchet wheels in one direction and synchronously drive the axle to coil a rope, when the handle is turned in a direction opposite of the first direction by using the axle as an axial center, the guide section of the handle and the stop portion of the body are slidably coupled with each other, and a radial movement of the handle is limited to prevent the handle from being separated from the axle in a radial direction.

2. The hand puller with a detachable handle of claim 1, wherein the body further includes an upper latch portion and an indentation formed sequentially on the first side plate and on the second side plate, and two stop portions are disposed on front ends of the two side plates, and the body also includes a brake base disposed at a rear end of the first side plate and the second side plate for accommodating the first brake plate, and a compression spring installed between the brake base and the first brake plate, such that the first brake plate exerts a propping force towards the penetrating hole of the body.

3. The hand puller with a detachable handle of claim 2, wherein the body includes a rope rod passed into a rear end of the body.

4. The hand puller with a detachable handle of claim 2, further comprising a bump disposed at an external periphery of each side plate, such that if the handle is turned to a position of the bump of the body, the guide section of the handle will not be stopped by the stop portion of the body and can be upwardly detached from the axle.

5. The hand puller with a detachable handle of claim 1, wherein the handle includes a slide slot formed symmetrically and separately on both sides of the handle and provided for accommodating the second brake plate, and the second brake plate is abutted by a torque spring to provide a propping force in a direction towards the sheath opening of the handle, such that the second brake plate can be embedded and latched to the corresponding ratchet wheel along the slide slot, and the handle can be used for pushing the corresponding ratchet wheel in a one-way direction to synchronously drive the axle to coil a rope when the handle is turned in an opposite rotational direction of the first brake plate by using the axle as an axial center.

6. The hand puller with a detachable handle of claim 1, wherein the guide section of the handle is substantially in a circular arc shape.

* * * * *